March 11, 1969  G. W. BUSH  3,431,586

HIDEAWAY HANDLE WITH I-SHAPED LINK

Filed Dec. 12, 1966  Sheet _1_ of _

INVENTOR.
GEORGE W. BUSH
BY
Max R. Millman
ATTORNEY.

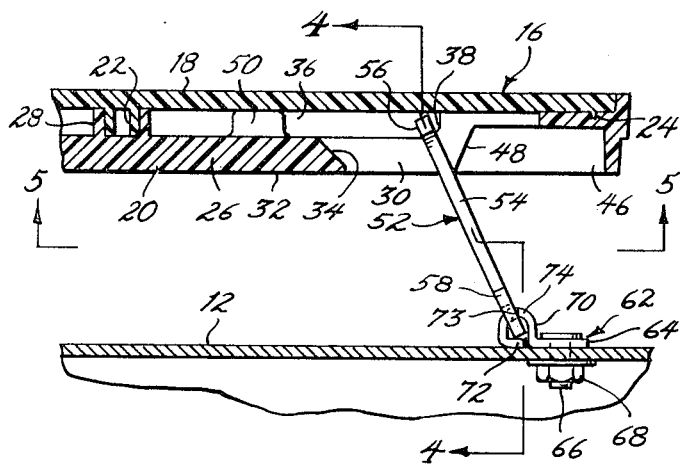
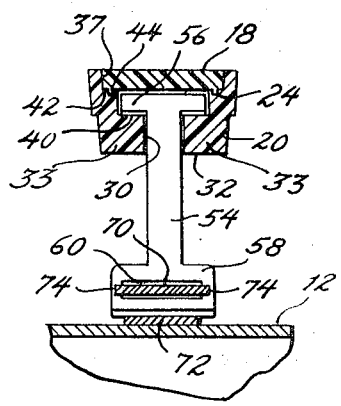
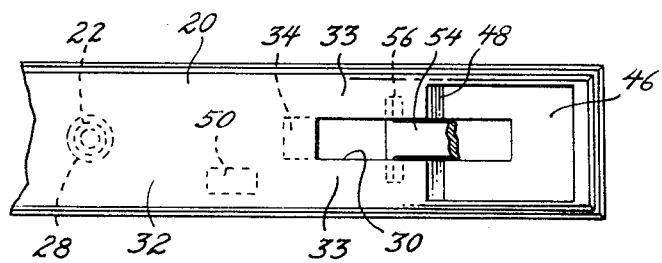
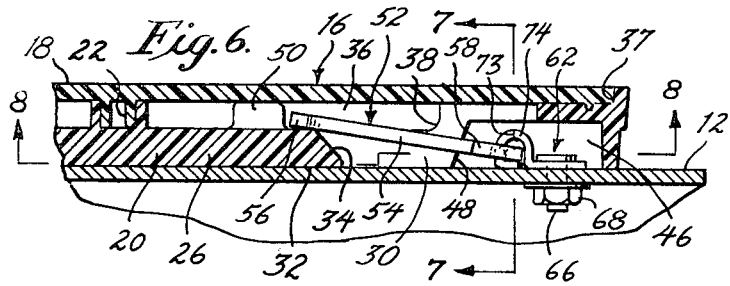
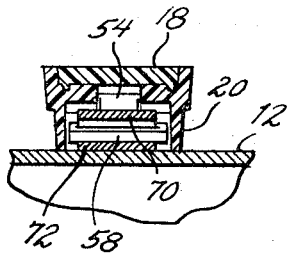
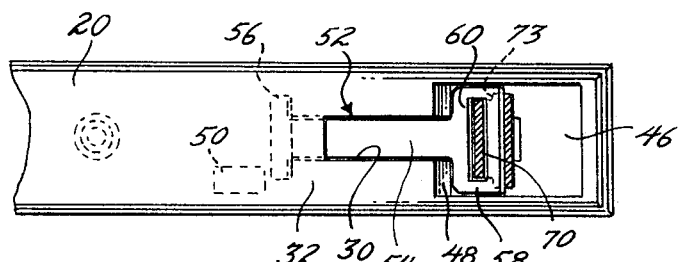

United States Patent Office 3,431,586
Patented Mar. 11, 1969

3,431,586
HIDEAWAY HANDLE WITH I-SHAPED LINK
George W. Bush, Haddonfield, N.J., assignor to Philadelphia Handle Company, Inc., Camden, N.J., a corporation of New Jersey
Filed Dec. 12, 1966, Ser. No. 601,144
U.S. Cl. 16—115          6 Claims
Int. Cl. E05b 5/00; A47b 95/02; B65d 25/28

ABSTRACT OF THE DISCLOSURE

A collapsible handle for a carrying case employing I-shaped links each having a shank which extends through the bottom of the handle and cross members at the ends thereof, one cross member being slidable longitudinally in the handle and the other cross member being hinged to the carrying case around a transverse axis whereby in the collapsed non-carrying position against the case, the links and hinge members are completely concealed.

---

The primary object of the invention is to provide a collapsible handle of the type which conceals the handle-mounting linkage in its collapsed non-carrying position in which the construction of the linkage and handle are such that the load-supporting capability of the handle is increased while its appearance is also improved.

Another object of the invention is to provide a collapsible handle of the character described which is fabricated of relatively few parts that can be readily and economically manufactured and assembled.

These and other objects of the invention will become more apparent as the following description proceeds in conjunction with the accompanying drawing, wherein:

FIG. 3 is an enlarged sectional view taken on the line 3—3 of FIG. 1;

FIG. 4 is a sectional view taken on the line 4—4 of FIG. 3;

FIG. 5 is a sectional view of the handle taken on the line 5—5 of FIG. 3;

FIG. 6 is an enlarged sectional view taken on the line 6—6 of FIG. 2;

FIG. 7 is a sectional view taken on the line 7—7 of FIG. 6;

FIG. 8 is a bottom plan view of the handgrip portion looking from the line 8—8 of FIG. 6;

Specific reference is now made to the drawings wherein similar reference characters are used for corresponding elements throughout.

Figures 1, 2:
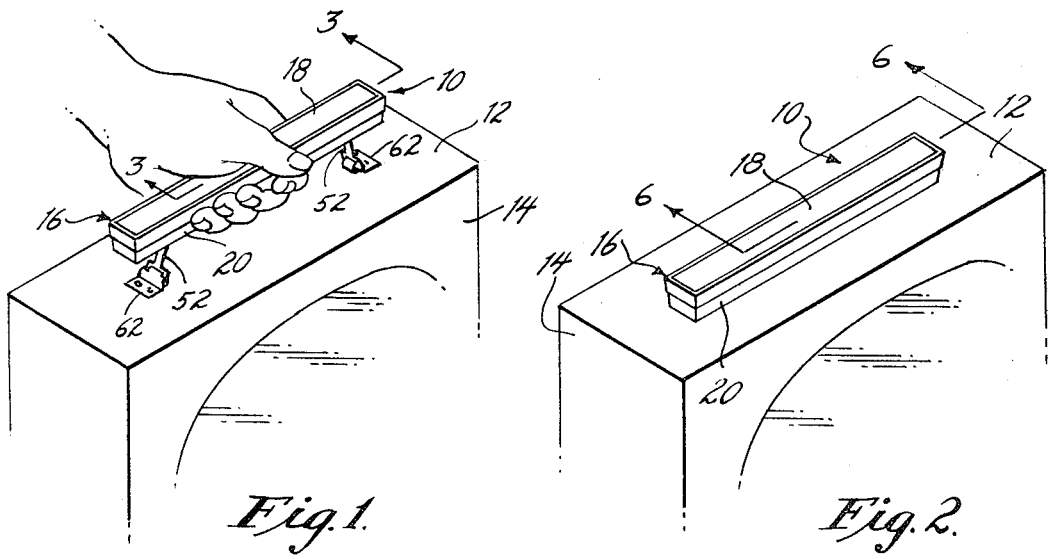
FIG. 1 is a fragmentary perspective view of the handle mounted on a carrying case and illustrating its raised or carrying position.
FIG. 2 is a view similar to FIG. 1 illustration the collapsed or non-carrying position of the handle.
Figure 9:
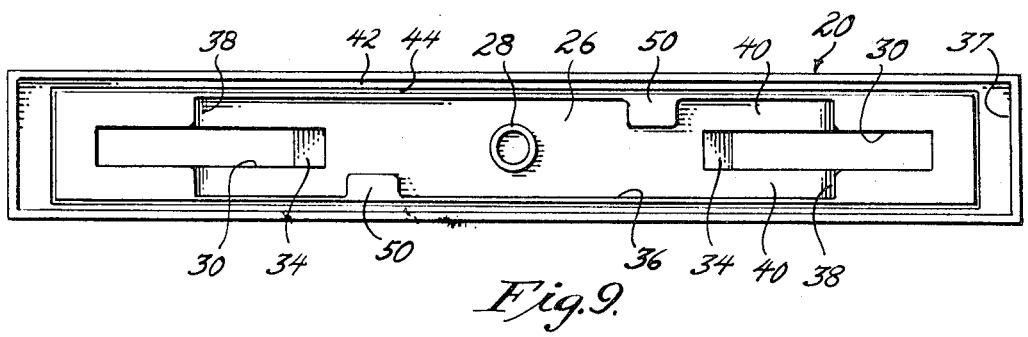
FIG. 9 is a top plan view of the handgrip portion with the cover removed.

The handle is generally indicated at 10 and is shown attached to the upper wall 12 of a television set 14 which is merely illustrative since the handle is applicable to other electronic devices, radios, test equipment, other carrying cases, luggage and the like. The handgrip portion 16 is molded of suitable colored or uncolored, decorated or undecorated plastics, such for example as polystyrene, and consists of an upper cover portion 18 and a lower body portion 20.

The cover portion 18 is generally flat and includes a central depending hollow substantially cylindrical locating boss 22 and a peripheral depending rib 24.

The body 20 of the handgrip portion derives its strength essentially from the fact that it is an elongated hollowed out channel whose central portion 26 includes an upstanding hollow protuberance 28 which receives the locating boss 22. Relatively narrow longitudinally extending slots 30 open through the bottom surface 32 on both sides of the central portion 26. Thus, there is substantial thickness of the handle material 33 on both sides of the slots 30, as seen in FIG. 4. The inner ends 34 of the slots are downwardly and outwardly beveled to permit the central portion 26 to provide a larger handgrip area.

The slots 30 communicate with an upper wider recess 36 which terminates at its ends in curved shoulders 38 which are disposed adjacent the outer ends of the slots 30. The recess 36 communicates at the top with an opening 37 which approximates the dimensions of the cover 18. Thus, as seen in FIG. 4, the cross-section of the handgrip is of step construction, there being inwardly extending longitudinal shoulders 40 between the recess 36 and slots 30 and an inwardly extending peripheral shoulder 42 between the recess 36 and the opening 37, the shoulder 42 having a groove 44 for receiving the peripheral rib 24 of the cover 18.

Thus when the cover is placed in the opening 37, the locating boss 22 enters the hollow member 28 of the body portion 20 of the handgrip and the rib 24 enters the groove 44 whereupon the cover and body portion can be readily welded ultrasonically, the cover acting to close off the upper recess 36.

Adjacent both ends of the handgrip are cavities 46 which at their inner ends form downwardly and inwardly inclined guide shoulders 48 which separate the slots 30 from the cavities. Adjacent the inner ends 34 of the slots 30, the recess 36 is provided with upstanding diagonally spaced stops 50 which may be welded as integral parts of the handgrip.

To hingedly connect the handgrip to the case, links 52 are provided each made of a relatively flat piece of metal, preferably steel, having a shank 54 which is somewhat narrower than and extends through each slot 30 and a cross head 56 at its inner end which is also somewhat narrower than and extends into the recess 36. The other or outer end of the shank is also enlarged to form a cross member 58 having a transverse slot or opening 60 therethrough. A metallic hinge bracket 62 is provided for each link, the same comprising a bar 64 having staked in screws 66 for insertion in appropriate holes in the wall 12 of the case there to be affixed by appropriate nuts 68. Upstanding from the plane of the bar 64 is an arcuate hollow bearing having a central portion 70 which extends through the slot 60 of the cross member 58, a return ledge portion 72 that is in the same plane as bar 64 and bears against the wall 12 and cut-out portions 73 on both sides of the central portion 70 which terminate in stop shoulders 74. Thus the outer end of the link 52 is pivotal on the bracket 62 about a transverse axis while the cross member 56 at its inner end is movable longitudinally in the recess 36.

In use, with the cover 18 welded to the body portion 20 and the link 52 assembled on the bracket 62, the links are turned so that their heads 56 extend lengthwise of the slots 30 and are pushed through the slots 30 until they reach the upper recess 36 where they are then rotated 90°. The screws 66 of the hinge brackets are then affixed in the holes of the case wall 12. When the handgrip is raised as shown in FIGS. 1 and 2, the cross heads 56 move outwardly and bear against the rounded shoulders 38 of the recess 36 in the final raised load-supporting position. In this position the link is not at a full 90° to the plane of the wall 12, because the cross-member 58 enters the cut-out portions 73 of the hinge bracket and is restrained by the shoulders 74 to prevent overturning of the links and hence accidental collapse of the handle. Normally the weight of the handle is such that when it is released it returns of its own weight whereby the cross heads 56 slide inwardly in the recess 36 and in the final collapsed position lie adjacent the stops 50. Should the handgrip twist while falling into the down position, the cross heads 56 will engage the stops 50 and straighten it out. In this collapsed position, the bottom surface 32 lies closely adjacent to or against the wall 12 wherein, as seen in FIG. 6, the shanks 54 of the links are totally confined in the slots 30 and the hinge brackets 62 and outer end 58 of the links engaging the brackets are totally confined in the cavities 46 which are dimensioned to receive and conceal them.

Figure 10:
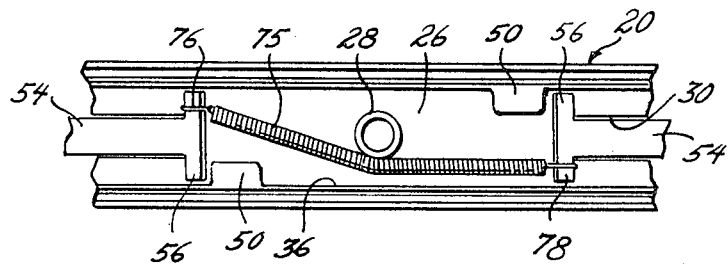
FIG. 10 is a fragmentary top plan view of the modified form of handle similar to FIG. 9.

To assist in the return of the handle to its collapsed position, a spring 75, see FIG. 10, may be terminally connected as at 76 and 78 to the cross heads 56 of the links and acting to urge the cross heads inwardly towards the stops 50, the spring being disposed in the recess 36 and extending around the member 28 of the handgrip. In this modification the links are extended through the slots 30, then turned and the spring is then connected to the cross heads 56 before the cover 18 is welded in place on the body portion 28. Then the screws 66 are secured in the holes in the case wall 12 to complete the mounting of the handle on the case.

In practice it has been found that a handle in accordance with the instant invention whose handgrip is molded of polystyrene and is about 7.50" long, has slots 30 whose width is about .260"–.270", and whose overall width is about 1.093" and steel links 52 each of whose shanks 54 is about .250" wide, whose cross head 56 is about .640" wide, whose lower cross member 70 is about .843" wide and which is about .093" thick is capable of comfortably supporting loads up to 60 pounds.

While preferred embodiments of the invention have been here shown and described, it will be understood that skilled artisans may make minor variations without departing from the spirit of the invention.

I claim:

1. A collapsible handle comprising an elongated handgrip having a bottom face, cavities opening through said bottom face adjacent the ends of said handgrip, hinge brackets adapted to be secured upon the wall of a carrying case and including an arcuate hollow transversely extending member, longitudinally extending slots opening through said bottom face inwardly of and adjacent said cavities, an elongated recess wider than said slots above and communicating with said slots and extending longitudinally between said cavities, I-shaped links having shanks passing through said slots each with a first cross head at one end thereof slidable longitudinally in said recess, and a second cross head at the other end of said shank including a transverse slot freely receiving said arcuate member of said hinge bracket so that in the collapsed position when said bottom face lies adjacent a wall of a carrying case said slots and said cavities encompass and conceal said shanks and said hinge members.

2. The combination of claim 1 wherein said arcuate transversely extending member includes a central portion extending freely through said transversely extending slot, said arcuate member also including cut-out portions on both sides of said central portion forming shoulders engaging said second cross head at the final raised position to prevent overturn and accidental collapse of said handgrip.

3. The combination of claim 1 wherein said handgrip comprises two plastic portions, a relatively flat upper member and a thicker body portion in the form of a dished out channel, said body portion including a peripheral shoulder with a groove therein, said upper member including a depending rib extending into said groove and being welded therein, said upper member covering said recess.

4. The combination of claim 3 and a locating boss depending from said upper member and a hollow member upstanding from said body portion receiving said boss.

5. The combination of claim 1 and a spring in said recess terminally secured to said first cross heads and normally urging said first cross heads inwardly of said handgrip towards each other so that said handgrip is urged downwardly towards its collapsed position against a wall of a carrying case.

6. The combination of claim 4 wherein said spring is terminally attached to diagonally opposite ends of said first cross heads, and stops adjacent those diagonally opposite ends of said first cross heads which are not attached to said spring.

References Cited

UNITED STATES PATENTS

| | | | |
|---|---|---|---|
| 3,340,971 | 9/1967 | Szabo | 190—58 |
| 2,723,417 | 10/1955 | Furholmen | 16—115 |

BOBBY R. GAY, Primary Examiner.

DORIS L. TROUTMAN, Assistant Examiner.

U.S. Cl. X.R.

190—58